United States Patent [19]
Zeitter

[11] 3,886,901
[45] June 3, 1975

[54] FOLDED CAT BOX AND FILLER MATERIAL PACKAGE

[75] Inventor: Charles R. Zeitter, Grand Rapids, Mich.

[73] Assignee: Lowe's, Inc., Cassopolis, Mich.

[22] Filed: May 10, 1974

[21] Appl. No.: 468,680

[52] U.S. Cl. .............. 119/1; 229/51 TC; 229/33 R; 229/14 B
[51] Int. Cl. .......................................... B65d 25/14
[58] Field of Search ...... 119/1; 229/51 TS, 33, 14 B

[56] References Cited
UNITED STATES PATENTS

| | | | |
|---|---|---|---|
| 2,741,223 | 4/1956 | Winborn, Jr. | 119/1 |
| 2,975,954 | 3/1961 | Sparks | 229/51 TS |
| 3,154,052 | 10/1964 | Sweeney | 229/33 |
| 3,170,618 | 2/1965 | Sweeney | 229/33 |
| 3,298,596 | 1/1967 | Tolaas et al. | 229/51 TS |
| 3,377,990 | 4/1968 | Mitchell | 119/1 |
| 3,684,155 | 8/1972 | Smith | 229/14 B |
| 3,743,170 | 7/1973 | Riccio | 119/1 X |

Primary Examiner—Davis T. Moorhead
Attorney, Agent, or Firm—Marmaduke Hobbs

[57] ABSTRACT

A folded cat litter box and filler material package, in which the box is sealed with a bag of litter contained therein. The box is opened by the use of a tearstrip extending across the top panel and downwardly at the sides, which are then folded outwardly to form the side walls of an enlarged cat litter box. The litter filler material in the bag is then poured into the box. The removal of the tearstrip provides all of the walls of the box with substantially the same height around the box without additional trimming or cutting in order to place the box in use.

8 Claims, 11 Drawing Figures

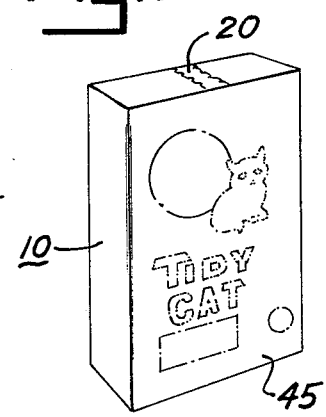
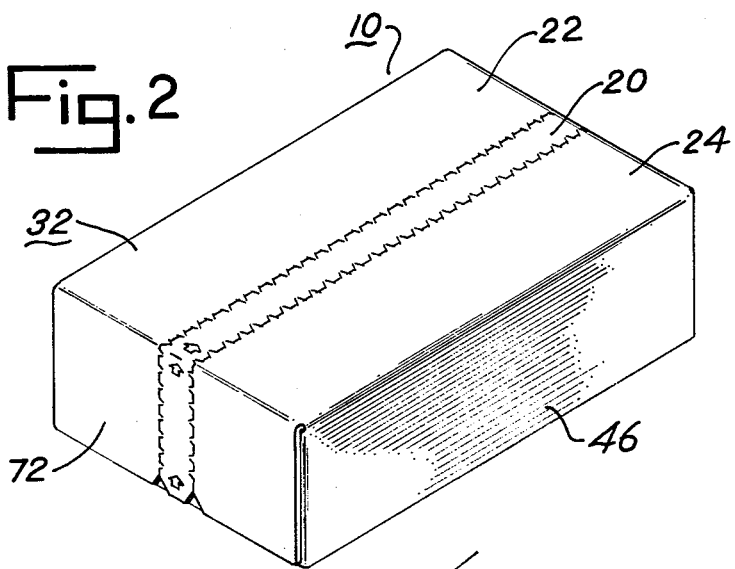
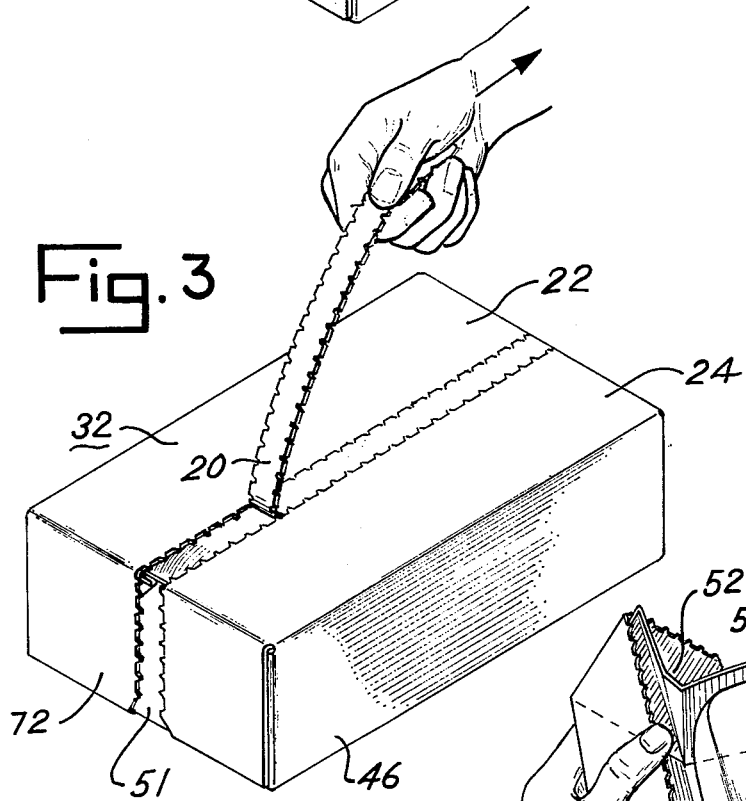
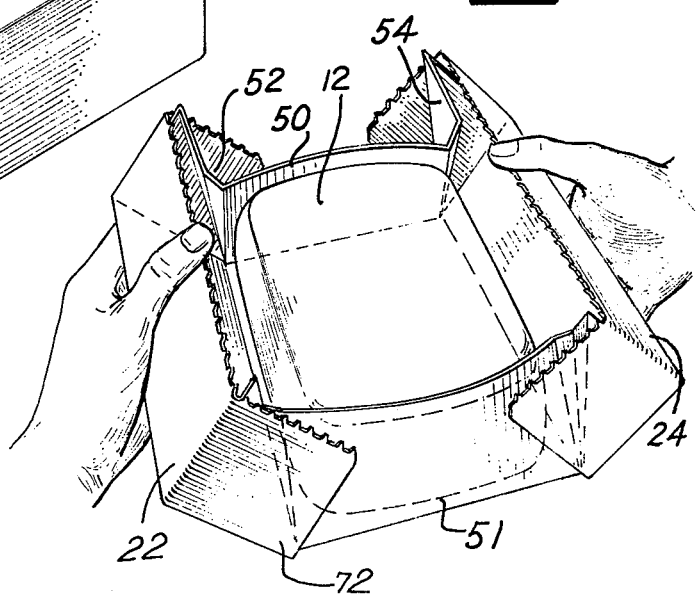

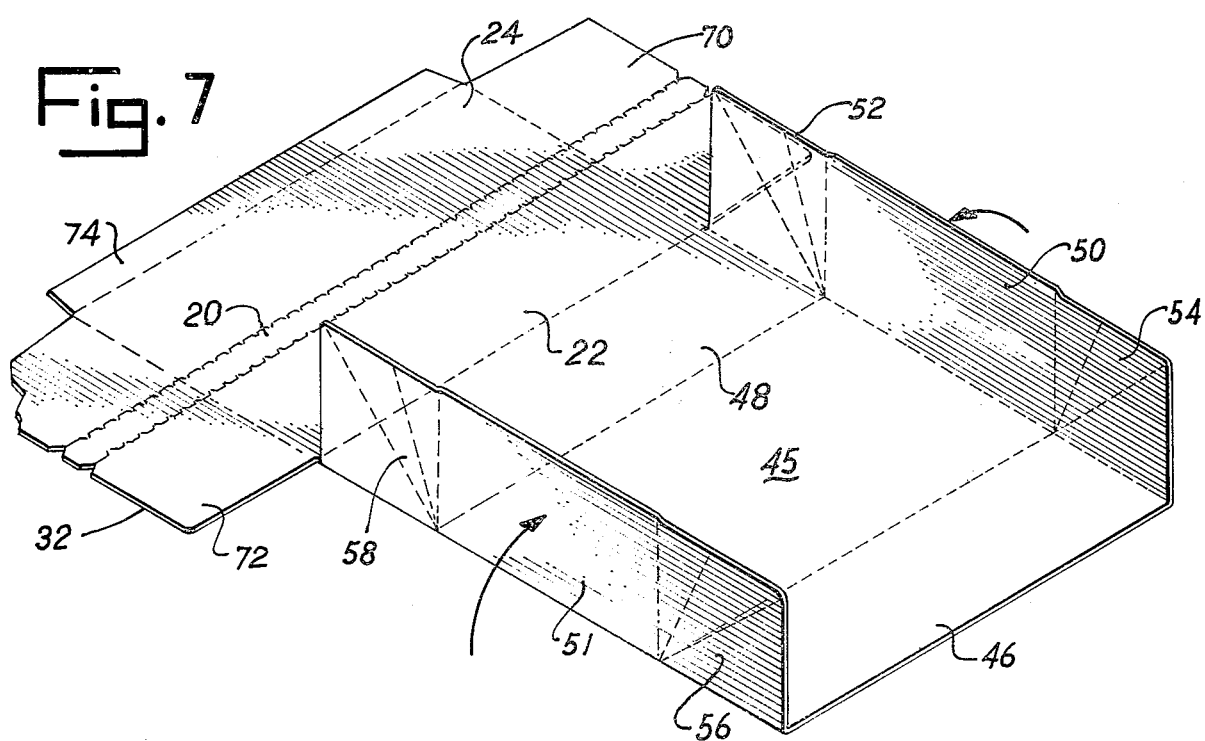
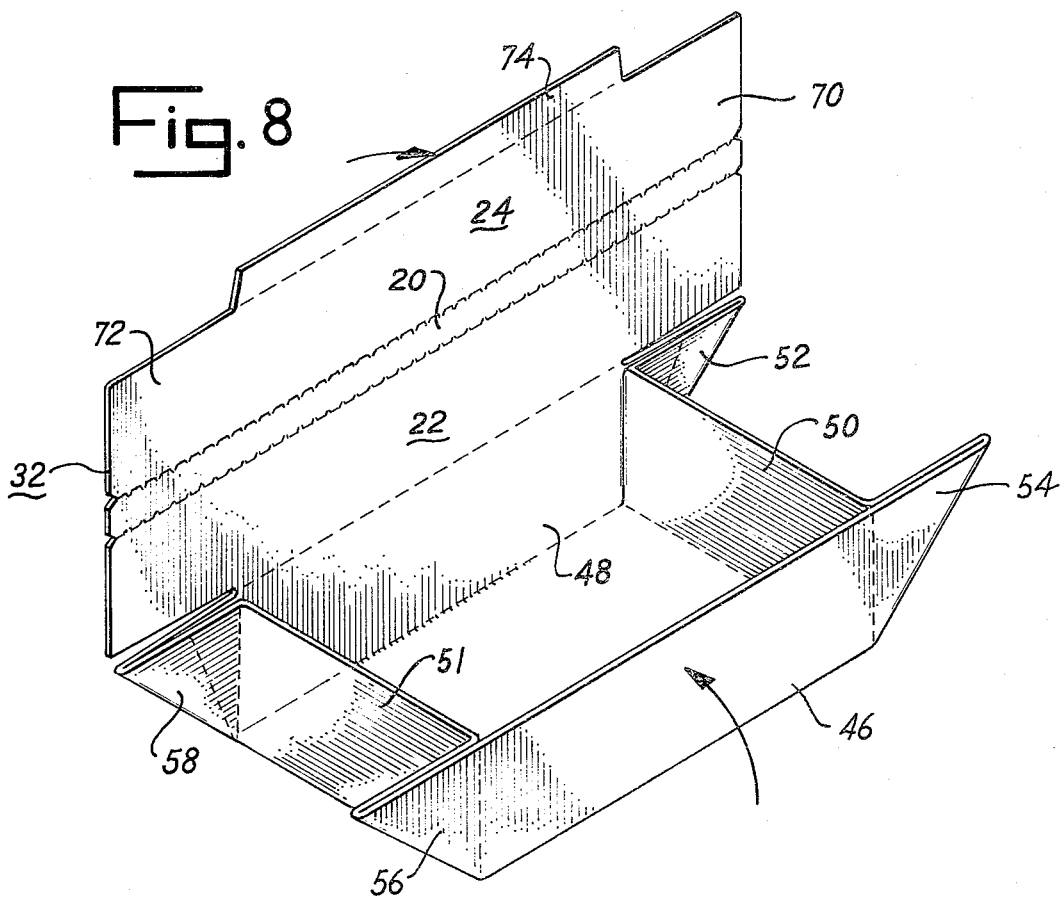

FOLDED CAT BOX AND FILLER MATERIAL PACKAGE

Various types of particulated materials are sold for use as cat litter to provide a convenient place and means in the home for cats to perform their natural instinct of burying their feces, and to provide an easy way to collect and dispose of the cat's waste. The litter material is normally sold in bags and is emptied into a box, pan or other container with low side walls and of sufficient size for the cat to stand in it and scratch the litter material without scattering the material outside the container. The litter containers used by the cats are often difficult to clean, in that the urine often filters down through the litter and settles in the bottom where the litter becomes permanently moist or saturated, making its removal from the container a tedious and unpleasant task. In view of the effort involved in disposing of the waste and cleaning the cat litter container, disposable containers have been tried and used on a limited basis, but more of these have had certain inherent disadvantages, such as the unreliability of the container to retain the particulated material and urine, instability of the container structure, particularly the side walls, and the excess expense of providing a dependable disposable container each time the litter is discarded. It is therefore one of the principal objects of the present invention to provide a folded cat box which is simple to open and easy to place in use, and which is economical to produce and sturdy in construction.

Another object of the invention is to provide a folded cat box which serves as a package for merchandising cat litter, and which forms an effective litter box of optimum size when the package is opened, thus providing both the box and litter in one easy-to-open package.

Still another object of the invention is to provide a combination cat box and litter package, which can easily be handled in shipment and effectively displayed, and which can be opened to form a box, and the box filled with the desired amount of litter without the likelihood of spilling the litter while opening and placing the box in use.

A further object is to provide a folded, disposable cat litter box which is capable of retaining the urine and moist litter without leakage through the material from which the box is constructed or at the folds or corners, and which can readily be refolded into a compact container with the used litter therein for disposal.

Additional objects and advantages of the present invention will become apparent from the following description and accompanying drawings wherein:

FIG. 1 is a perspective view of a cat box and filler material package, illustrating the manner in which it is displayed in supermarkets, hardware stores and other consumer outlets;

FIG. 2 is an enlarged perspective view of the opposite side of the package shown in FIG. 1;

FIG. 3 is a perspective view of the package illustrating the manner in which it is opened by the use of a tearstrip;

FIG. 4 is a perspective view, further illustrating the manner in which the package is opened after the tearstrip has been removed, and showing a bag of filler material disposed therein;

FIG. 7 is a perspective view of the box in partially constructed condition as made from the panel shown in FIG. 6;

FIG. 8 is a perspective view of the box illustrating a further step in the formation of the box;

Figure 5:
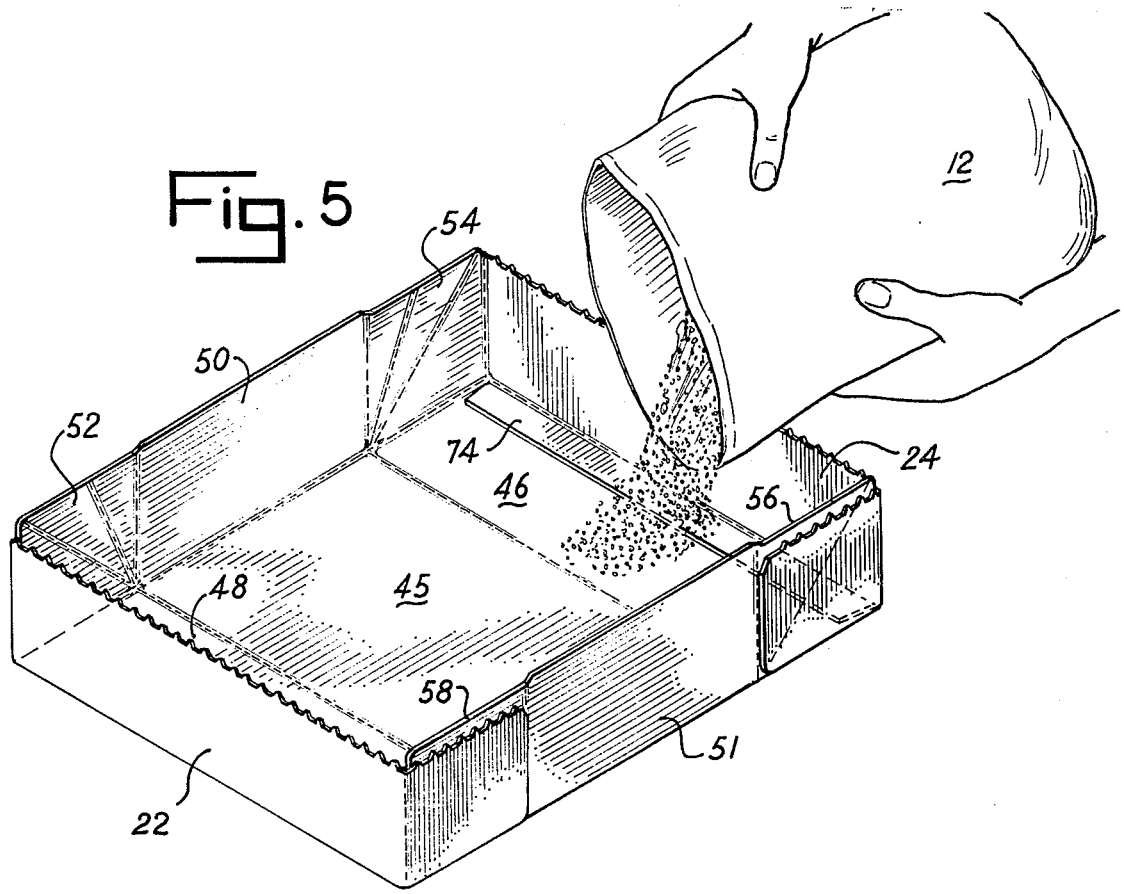
FIG. 5 is a perspective view of the box after it has been fully opened, showing the addition of the litter to the box from the bag seen in FIG. 4.

Referring more specifically to the drawings, numeral 10 designates the cat box and filler material package with the box in closed position and sealed, and numeral 12 indicates a package of litter material sealed in the package and consisting of a paper or plastic bag with a measured amount of litter material therein. The bag is closed and preferably sealed, so that when the box is opened the material will not spill from the box until the bag is intentionally opened for placing the material in the box. Various types of litter material may be used in the cat box and filler material package, a well-known litter material consisting of calcined granular, absorbent clay, which usually contains an odor depressant chemical and which will absorb the cat's urine and minimize the odor from the waste.

One of the principal features of the present invention is the use of a tearstrip 20 which is disposed between panels 22 and 24, and is removed as illustrated in FIG. 3 when the box is opened. The tearstrip permits the box to be easily opened and the panels 22 and 24 and the connecting side walls folded outwardly into the position illustrated in FIG. 4, and thence to the position illustrated in FIG. 5. The bag 12 is then opened and all or a measured amount of the litter is poured from the bag into the unfolded box. While there may be a slight tendency for the folded side walls of the box to lean inwardly, the weight of the litter material is sufficient to keep the side walls of the final box in substantially upright or vertical position.

Figure 6:
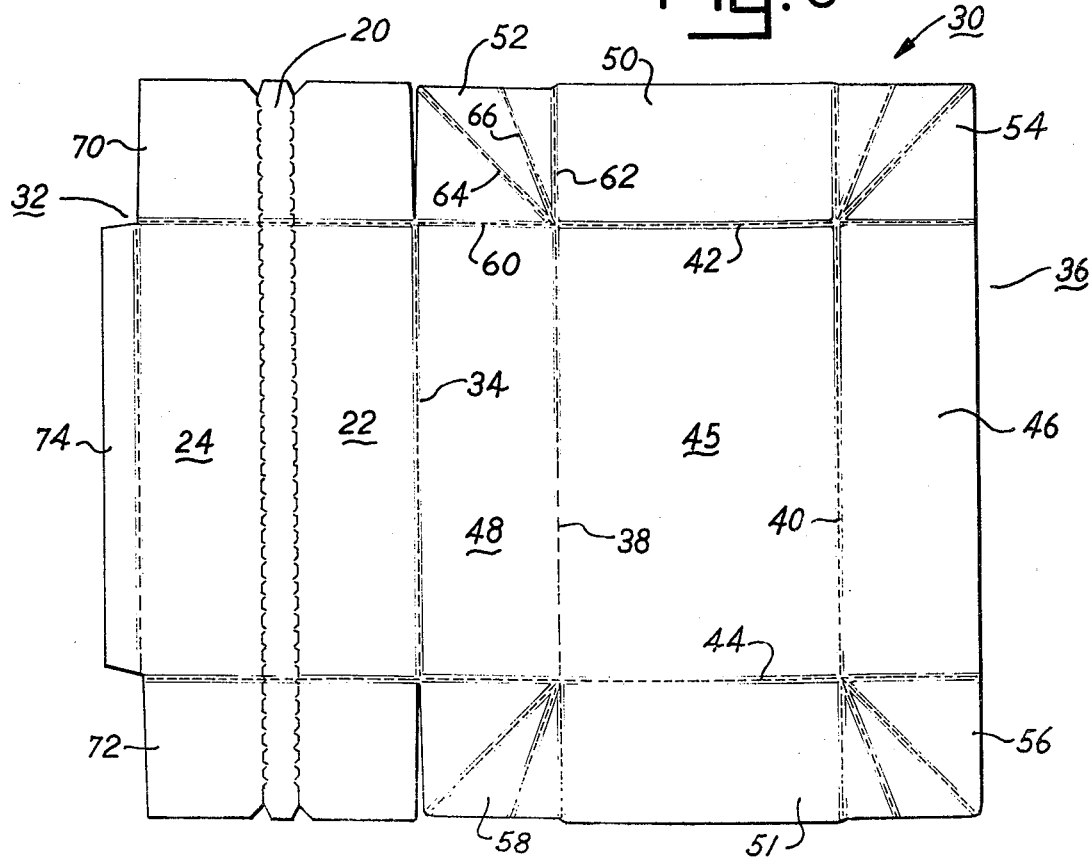
FIG. 6 is a plan view of a panel from which the box is constructed, showing score lines where the panel is folded to make the box.
Figure 9:
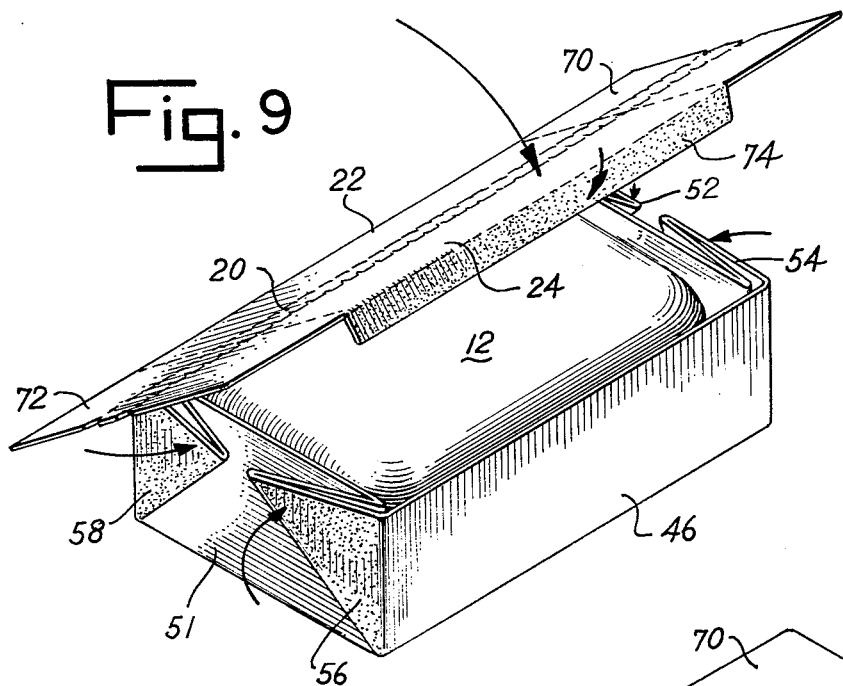
FIG. 9 is a perspective view of a step showing the box being closed with a bag of litter material enclosed therein.

The box is formed from a pressboard, paperboard or cardboard treated with wax or any other suitable water repellent material, and is formed from a panel 30 such as that shown in FIG. 6. The panels 22 and 24 and tearstrip 20 form a top section or panel 32 which is attached at a score line 34 to main section 36, the latter section being scored along lines 38, 40, 42 and 44 to form the front of the package as seen in FIG. 1, and the bottom 45 of the box when the box is in use, as seen in FIG. 5. These lines also define an edge of side walls 46, 48, 50 and 51. The four corners 52, 54, 56 and 58, are defined on their inner edges by score lines 60 and 62. Two diagonal score lines 64 and 66 are provided for facilitating folding of the corners inwardly when the sides 46, 48, 50 and 51 are folded upwardly at right angles to the front or bottom panel 45, as illustrated in FIGS. 7 and 8. Section 32 is folded inwardly and downwardly as shown in FIGS. 8 and 9 and the four corners are folded inwardly over the outside edges of panels 50 and 51. The end sections 70 and 72 of top panel 32 are then turned downwardly over their respective folded corners and glued or otherwise firmly secured to the outer surface of the folded corners, and a tab 74 along the longitudinal edge of section 32 is tucked inwardly along the inner side of wall 46 and glued or otherwise secured to the inner surface of the wall, thus closing the box. However, before section 32 is folded downwardly from the position shown in FIG. 8 to the positions shown in FIGS. 9 through 11, bag 12 of cat litter is placed in the box and is thus enclosed and sealed therein, where it remains until the box is opened by the removal of the tearstrip 20. It is understood the carton may be preglued by the manufacturer affixing panel 74 to panel 46 which would require loading the flexible bag from either end 50 or end 51. The bag should be of sufficient length to support the end panels during the folding and sealing process and during shipping, stacking and handling.

Figure 10:
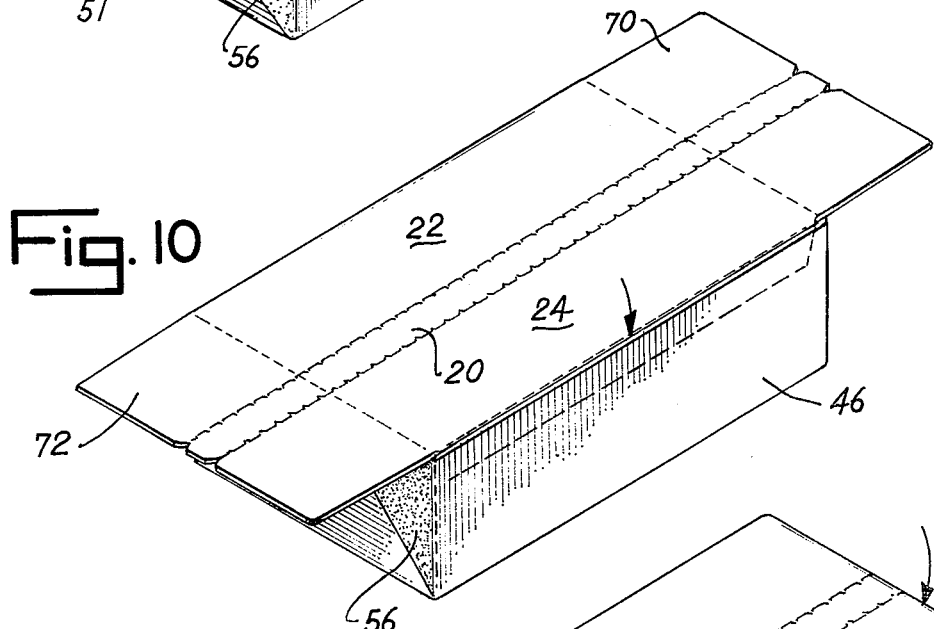
FIG. 10 is a perspective view showing the box ready for the final closing step.

The litter material is packaged in an easily opened bag, which prevents the litter from being scattered until the box has been opened and in condition for receiving the litter material. The bag may be either paper or plastic and may contain a tearstrip, or it may merely be tied, sewed or glued. After the bag has been placed in the box and the box fully closed, as illustrated in FIGS. 9, 10 and 11, the combination package can effectively be handled in shipping and displayed at supermarkets, hardware stores and other consumer outlets, and the outer surface of the front or bottom panel 45 is preferably provided with the brand name or trademark.

When the combination cat box and the litter bag package is to be used, the tab at either end of the tearstrip 20 is raised and pulled, thus severing the tearstrip along the perforated lines on each side of the tearstrip, in the manner illustrated in FIG. 3. When the tearstrip has been removed, panels 22 and 24 and the respective side wall sections 46 and 48 are folded outwardly away from one another as the corners 52, 54, 56 and 58 unfold, in the manner illustrated in FIG. 4 along lines 64 and 66 of their respective corners. When walls 46 and 48 are parallel with bottom 45, they too form a part of the bottom, and the respective panels 22 and 24 form the end walls of the box. Walls 50 and 51, together with the adjoining corners 52 and 54 of wall 50 and corners 56 and 58 of wall 51 form the longitudinal side walls of the box. Panel 24, which was initially secured to side wall 46 when the box was closed by tab 74, remains attached to the side wall when the box is opened.

Figure 11:
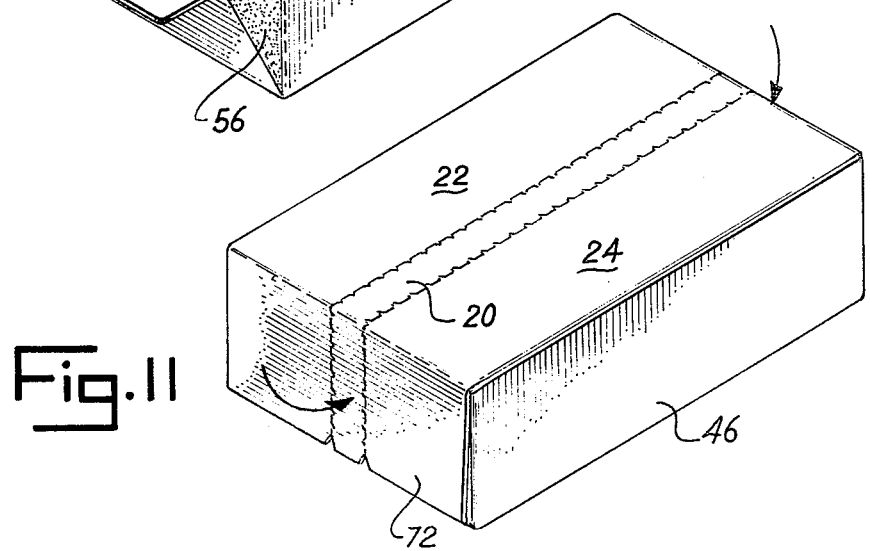
FIG. 11 is a perspective view of the final box, illustrating the manner in which the final closing is accomplished.

After the box has been unfolded from the position shown in FIGS. 2 and 11 to the position shown in FIG. 5, the bag 12 is opened and all or a measured amount of the cat litter material is placed in the box and spread evenly between the side walls. The side walls will normally remain in a substantially upright position; however, the slight pressure of the litter in the box assists in retaining them in a vertical position.

When the litter has become soiled to the extent that it is no longer suitable for use by the cat, the box can easily and readily be folded back to the position shown in FIGS. 3 and 4, and the opening formed by the tearstrip pressed substantially closed, to permit the cat litter and the box to be discarded as a unit without any mess or cleaning required. Since the inside of the box is water repellent, any urine in excess of that which can be absorbed by the litter will not leak from the box, since there are no open joints or corners through which either the urine can leak or the particulated material can sift.

It is seen that the present foldable cat box and filler material package provides a fully enclosed compact package which cannot be opened without telltale evidence, and which retains the cat material securely in sealed condition in the box until it is ready for use. The box can be opened easily by removing the tearstrip 20, thereby permitting the sections to fold out into a full size cat litter box, without any cutting or prying, either with or without instruments being required to open the litter box. With the litter being in a bag, there is no likelihood of spillage, of the litter until it is intentionally poured into the box after the box has been fully opened into its usable condition. In the preferred embodiment, the litter is packaged in a bag or the like; however, in some instances it may merely be sealed loose in the box.

For convenience in describing the invention in certain places in the specification and in the claims, panel 45 is referred to as the bottom and panel 32 is referred to as the top; however, the package may be oriented to other positions and stood on end where the bottom 45 serves as the front of the package in the store display. While only one embodiment of the folded cat box and filler material package has been disclosed herein in detail, various changes and modifications may be made without departing from the scope of the invention.

I claim:

1. A folded cat box and filler material package, comprising a rectangular bottom panel, end walls connected to two opposite edges of said bottom panel and extending at right angles thereto, side walls connected to the other two opposite edges of said bottom panel and extending at right angles in the same direction as said end walls, foldable corners interconnecting the adjacent ends of said end and side walls, a top panel secured to the upper edges of said side walls and having end sections extending downwardly over the outside surface of said end panels and being secured to the respective foldable corners, a tear strip disposed near the longitudinal center of said top panel and extending through said end sections for separating said top panel into two sections to form opposite walls of the unfolded box, and a package of litter sealed in said box for use therein when the box is opened and unfolded.

2. A folded cat box and filler material package as defined in claim 1 in which said box is constructed of paperboard treated on its internal surface with a urine repellent material.

3. A folded cat box and filler material package as defined in claim 1 in which the package containing said litter in said box is a flexible bag.

4. A folded cat box and filler material package as defined in claim 1 in which said top panel is longer in one direction than in the other and said tearstrip extends in the longitudinal direction of said top panel and said sections of the top panel formed by the removal of the tearstrip form end walls of the unfolded litter box, and said end walls of said box together with the adjacent corners, form the side walls of the unfolded box.

5. A folded cat box and filler material package as defined in claim 4 in which the package containing said litter in said box is a flexible bag.

6. A foldable cat litter box, comprising a rectangular bottom panel, end walls connected to two opposite edges of said bottom panel and extending at right angles thereto, side walls connected to the other two opposite edges of said bottom panel and extending at right angles in the same direction as said end walls, foldable corners interconnecting the adjacent ends of said end and side walls, a top panel secured to the upper edges of said side walls and having end sections extending downwardly over the outside surface of said end panels and being secured to the respective foldable corners, and a tearstrip disposed near the longitudinal center of said top panel and extending through said end sections for separating said top panel into two sections to form opposite walls of the unfolded box.

7. A foldable cat litter box as defined in claim 6 in which said box is constructed of paperboard treated on its internal surface with a urine repellent material.

8. A foldable cat litter box as defined in claim 6 in which said top panel is longer in one direction than in the other, and said tearstrip extends in the longitudinal direction of said top panel, and said sections of the top panel formed by the removal of the tearstrip form end walls of the unfolded litter box, and said end walls of said box, together with the adjacent corners, form the side walls of the unfolded box.

* * * * *